(12) United States Patent
Patterson et al.

(10) Patent No.: US 12,316,764 B2
(45) Date of Patent: May 27, 2025

(54) TOKEN FAILSAFE SYSTEM AND METHOD

(71) Applicant: Visa International Service Association, San Francisco, CA (US)

(72) Inventors: Barbara Patterson, South San Francisco, CA (US); Anjana Surin, Foster City, CA (US)

(73) Assignee: Visa International Service Association, San Francisco, CA (US)

( * ) Notice: Subject to any disclaimer, the term of this patent is extended or adjusted under 35 U.S.C. 154(b) by 274 days.

(21) Appl. No.: 18/044,202

(22) PCT Filed: Oct. 9, 2020

(86) PCT No.: PCT/US2020/054929
§ 371 (c)(1),
(2) Date: Mar. 6, 2023

(87) PCT Pub. No.: WO2022/075995
PCT Pub. Date: Apr. 14, 2022

(65) Prior Publication Data
US 2023/0318832 A1    Oct. 5, 2023

(51) Int. Cl.
*H04L 29/06* (2006.01)
*H04L 9/32* (2006.01)

(52) U.S. Cl.
CPC .......... *H04L 9/3213* (2013.01); *H04L 9/3297* (2013.01)

(58) Field of Classification Search
None
See application file for complete search history.

(56) References Cited

U.S. PATENT DOCUMENTS 8,661,252 B2 * 2/2014 Chandwani ......... H04L 61/5092
713/168
9,602,508 B1 * 3/2017 Mahaffey ............... H04L 9/3271
(Continued)

FOREIGN PATENT DOCUMENTS

KR    20150130545 A    11/2015
WO    2020076854 A2    4/2020

OTHER PUBLICATIONS

Raykova, Mariana et al. Decentralized Authorization and Privacy-Enhanced Routing for Information-Centric Networks. ACSAC '15: Proceedings of the 31st Annual Computer Security Applications Conference. https://doi.org/10.1145/2818000.2818001. (Year: 2015).*

(Continued)

*Primary Examiner* — Jeremiah L Avery
(74) *Attorney, Agent, or Firm* — Kilpatrick Townsend & Stockton LLP

(57) ABSTRACT

A method comprises a token requestor computer transmitting a first authorization request message comprising a token and first cryptogram for authorization of an interaction to a server computer. The token requestor computer receives a first authorization response message comprising a response code from the server computer, then generates a cryptogram request message comprising the token or a token identifier and the response code. The token requestor computer transmits the cryptogram request message to a token provider computer, which generates a second cryptogram. The token requestor computer receives the second cryptogram and credential and generates a second authorization request message comprising the second cryptogram and the credential. The token requestor computer transmits the second authorization request message to the server computer. A second authorization response message is received from the server computer in response to the second authorization (Continued)

request message. The second authorization response message indicates whether the interaction is authorized.

20 Claims, 4 Drawing Sheets

(56) References Cited

U.S. PATENT DOCUMENTS

| | | | |
|---|---|---|---|
| 9,819,665 B1* | 11/2017 | Machani | H04L 63/08 |
| 2010/0318812 A1* | 12/2010 | Auradkar | H04L 9/0894 |
| | | | 713/193 |
| 2011/0270757 A1* | 11/2011 | Hammad | G06Q 20/425 |
| | | | 726/5 |
| 2012/0143772 A1* | 6/2012 | Abadir | H04L 9/321 |
| | | | 705/26.1 |
| 2013/0227291 A1* | 8/2013 | Ahmed | H04L 63/0884 |
| | | | 713/168 |
| 2013/0346753 A1* | 12/2013 | Boysen | H04L 9/40 |
| | | | 713/168 |
| 2014/0195807 A1* | 7/2014 | Bar-El | H04L 9/0877 |
| | | | 713/168 |
| 2014/0223178 A1* | 8/2014 | Islam | G06F 21/31 |
| | | | 713/168 |
| 2016/0065571 A1* | 3/2016 | Hoyos | H04L 63/0428 |
| | | | 713/168 |
| 2016/0156598 A1* | 6/2016 | Alonso Cebrian | |
| | | | H04L 63/0861 |
| | | | 713/168 |
| 2016/0232527 A1 | 8/2016 | Patterson | |
| 2016/0253651 A1 | 9/2016 | Park et al. | |
| 2017/0124558 A1* | 5/2017 | Molnar | H04L 63/08 |
| 2017/0337549 A1* | 11/2017 | Wong | G06Q 20/3821 |
| 2017/0346807 A1* | 11/2017 | Blasi | H04L 63/0442 |
| 2019/0020478 A1 | 1/2019 | Girish et al. | |
| 2019/0026450 A1* | 1/2019 | Egner | G06F 21/44 |
| 2019/0028478 A1* | 1/2019 | Love | H04L 63/102 |
| 2019/0109713 A1* | 4/2019 | Clark | G06F 16/182 |
| 2019/0228144 A1* | 7/2019 | Kermes | H04L 63/0861 |
| 2019/0334718 A1* | 10/2019 | Li | H04W 12/069 |
| 2019/0372958 A1* | 12/2019 | Dunjic | H04L 9/3213 |
| 2020/0053072 A1* | 2/2020 | Glozman | H04W 12/08 |
| 2020/0067922 A1* | 2/2020 | Avetisov | H04L 63/0823 |
| 2020/0077246 A1* | 3/2020 | Mars | G06Q 40/02 |
| 2020/0104841 A1* | 4/2020 | Osborn | G06Q 20/341 |
| 2020/0160325 A1 | 5/2020 | Kim et al. | |
| 2020/0274708 A1* | 8/2020 | Vijayanarayanan | |
| | | | H04L 9/3247 |
| 2020/0320211 A1* | 10/2020 | Moore | H04L 63/12 |
| 2020/0322148 A1* | 10/2020 | McGough | H04L 9/0869 |
| 2021/0004786 A1* | 1/2021 | Mossler | H04L 9/3073 |
| 2021/0099297 A1* | 4/2021 | Mane | H04L 9/3213 |
| 2021/0273804 A1* | 9/2021 | Khan | H04L 9/3234 |
| 2021/0288973 A1* | 9/2021 | Dimble | H04W 12/108 |
| 2021/0344492 A1* | 11/2021 | Goodsitt | H04L 9/3215 |
| 2021/0392136 A1* | 12/2021 | Modi | H04L 9/3234 |
| 2022/0021751 A1* | 1/2022 | Devine | H04L 9/3234 |

OTHER PUBLICATIONS

Dodanduwa, Kavindu; Kaluthanthri, Ishara. Trust-based identity sharing for token grants. ICCSP '19: Proceedings of the 3rd International Conference on Cryptography, Security and Privacy. https://doi.org/10.1145/3309074.3309078 (Year: 2019).*

Helland, Randy et al. Authentication and Authorization Considerations for a Multi-tenant Service. Scream '15: Proceedings of the 1st Workshop on The Science of Cyberinfrastructure: Research, Experience, Applications and Models. https://doi.org/10.1145/2753524.2753534 (Year: 2015).*

PCT/US2020/054929, "International Search Report and Written Opinion", Jun. 21, 2021, 11 pages.

EP20956894.8 , "Extended European Serach Report", Oct. 5, 2023, 6 pages.

* cited by examiner

TOKEN FAILSAFE SYSTEM AND METHOD

CROSS-REFERENCE TO RELATED APPLICATIONS

This application is a National Stage of International Application No. PCT/US2020/054929, filed on Oct. 9, 2020, which is herein incorporated by reference in its entirety.

BACKGROUND

Token based interactions are performed to allow user's to obtain resources provided by a resource provider. A token can be provided to an authorizing entity for authorization of the interaction. If the token interaction fails, then the interaction is terminated. There are a variety of reasons why a token interaction will fail. For example, the failure may occur due to a mistake or other non-malicious reason. As an illustration, a token interaction may fail due to the presence of an incorrect cryptogram, an incorrect token, a missing data field, a blacklisted token, etc.

However, currently when a token interaction fails, the user and resource provider can only attempt to perform the same authorization request again. As such, it will most likely fail again.

Embodiments of the disclosure address this problem and other problems individually and collectively.

SUMMARY

One embodiment is related to a method comprising: transmitting, by a token requestor computer, a first authorization request message comprising a token and a first cryptogram for authorization of an interaction between a user and a resource provider to a server computer, wherein the token is associated with a credential; receiving, by the token requestor computer, a first authorization response message comprising a response code from the server computer; responsive to receiving the first authorization response message, generating, by the token requestor computer, a cryptogram request message comprising the token or a token identifier associated with the token and the response code; transmitting, by the token requestor computer, the cryptogram request message to a token provider computer, wherein the token provider computer generates a second cryptogram, and provides the second cryptogram and the credential to the token requestor computer; receiving, by the token requestor computer, the second cryptogram and the credential from the token provider computer; generating, by the token requestor computer, a second authorization request message comprising the second cryptogram and the credential; transmitting, by the token requestor computer, the second authorization request message to the server computer for the interaction; and receiving a second authorization response message from the server computer in response to the second authorization request message, the second authorization response message indicating whether the interaction is authorized.

Another embodiment is related to a method comprising: transmitting, by a token requestor computer to an authorizing entity computer, an authorization request message comprising a token and a cryptogram for authorization of an interaction between a user and a resource provider, wherein the token is associated with a first credential; receiving, by the token requestor computer, an authorization response message comprising a response code that indicates a reason why the interaction is declined; generating, by the token requestor computer, a second cryptogram request message comprising a token identifier associated with the token, the response code, and an authorization flag that indicates that the interaction is declined; transmitting, by the token requestor computer, the second cryptogram request message to a token provider computer, wherein the token provider computer generates a second cryptogram, and provides the second cryptogram and the first credential to the token requestor computer; receiving, by the token requestor computer, the second cryptogram and the first credential from the token provider computer; generating, by the token requestor computer, a second authorization request message comprising the second cryptogram and the first credential; and transmitting, by the token requestor computer, the second authorization request message to the authorizing entity computer, wherein the authorizing entity computer determines whether or not to authorize the interaction.

Another embodiment is related to a token requestor computer comprising a processor and a computer-readable medium coupled to the processor, the computer-readable medium comprising code executable by the processor for implementing a method. The method can include transmitting a first authorization request message comprising a token and a first cryptogram for authorization of an interaction between a user and a resource provider to a server computer, wherein the token is associated with a credential; receiving a first authorization response message comprising a response code from the server computer; responsive to receiving the first authorization response message, generating, by the token requestor computer, a cryptogram request message comprising the token or a token identifier associated with the token and the response code; transmitting the cryptogram request message to a token provider computer, wherein the token provider computer generates a second cryptogram, and provides the second cryptogram and the credential to the token requestor computer; receiving the second cryptogram and the credential from the token provider computer; generating a second authorization request message comprising the second cryptogram and the credential; transmitting the second authorization request message to the server computer for the interaction; and receiving a second authorization response message from the server computer in response to the second authorization request message, the second authorization response message indicating whether the interaction is authorized.

Another embodiment is related to a method comprising: receiving, by a token provider computer from a token requestor computer, a cryptogram request message comprising a token or a token identifier associated with the token and a response code; determining, by the token provider computer, whether or not to provide a cryptogram to the token requestor computer based on the response code; generating, by the token provider computer, the cryptogram; generating, by the token provider computer, a cryptogram response message comprising the cryptogram and a credential; and providing, by the token provider computer, the cryptogram response message to the token requestor computer, wherein the token provider computer transmits an authorization request message comprising the cryptogram and the credential to a server computer for an interaction and receives an authorization response message from the server computer in response to the authorization request message, the authorization response message indicating whether the interaction is authorized.

Further details regarding embodiments of the disclosure can be found in the Detailed Description and the Figures.

DETAILED DESCRIPTION

Figure 1:
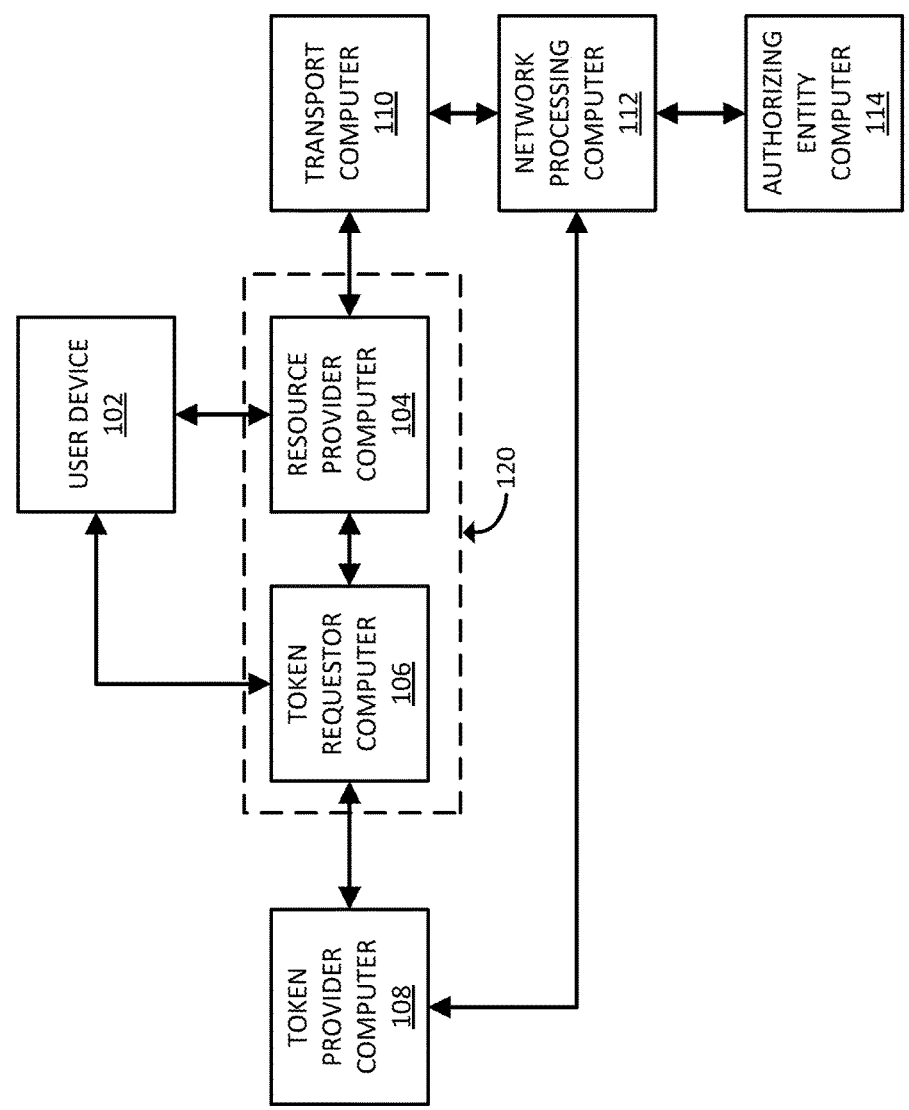
FIG. 1 shows a block diagram of a token system according to embodiments.

Prior to discussing embodiments of the disclosure, some terms can be described in further detail.

A "user" may include an individual. In some embodiments, a user may be associated with one or more personal accounts and/or user devices. The user may also be referred to as a cardholder, account holder, or consumer in some embodiments.

A "user device" may be a device that is operated by a user. Examples of user devices may include a mobile phone, a smart phone, a card, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

A "cryptogram" may include a piece of obscured text such as encrypted text. A cryptogram may be formed by encrypting input data with an encryption key such as a symmetric encryption key. In some embodiments, a cryptogram is reversible so that the inputs that are used to form the cryptogram can be obtained using the same symmetric key to perform a decryption process. In some embodiments, if input data is encrypted using a private key of a public/private key pair, the cryptogram may also be a digital signature. A digital signature may be verified with a public key of the public/private key pair. In some embodiments, a cryptogram may include a dCVV (dynamic card verification value).

In embodiments of the invention, a cryptogram can be generated in any suitable manner. In some embodiments, the input to the cryptogram can include data elements including an account identifier such as primary account number, and a variable data element such as a counter, a time of day, or interaction value. Such data may be included using an encryption process such as DES, triple DES, or AES using any suitable encryption keys. The encryption keys may also be UDKs (unique derived keys) and may be generated based upon device specific information such as an account number, which may be encrypted using a master derivation key (MDK). The cryptogram can be verified by another computer such a remote computer by either decrypting the cryptogram to and verifying the decrypted contents with other data (e.g., an account number stored on file), or by encrypting other inputs and then comparing the encrypted result to the cryptogram.

"Credentials" may comprise any evidence of authority, rights, or entitlement to privileges. For example, access credentials may comprise permissions to access certain tangible or intangible assets, such as a building or a file. Examples of credentials may include passwords, passcodes, or secret messages. In another example, payment credentials may include any suitable information associated with and/or identifying an account (e.g., a payment account and/or payment device associated with the account). Such information may be directly related to the account or may be derived from information related to the account. Examples of account information may include an "account identifier" such as a PAN (primary account number or "account number"), a token, a subtoken, a gift card number or code, a prepaid card number or code, a user name, an expiration date, a CVV (card verification value), a dCVV (dynamic card verification value), a CVV2 (card verification value 2), a CVC3 card verification value, etc. An example of a PAN is a 16-digit number, such as "4147 0900 0000 1234". In some embodiments, credentials may be considered sensitive information.

A "token" may be a value that can be used in processing data. In some embodiments, a token is a value generated by a remote computer that is used in an authentication process. In some cases, a token can be a substitute value for a real credential. A token may be a string of numbers, letters, or any other suitable characters.

The term "verification" and its derivatives may include a process that utilizes information to determine whether an underlying subject is valid under a given set of circumstances. Verification may include any comparison of information to ensure some data or information is correct, valid, accurate, legitimate, and/or in good standing.

An "interaction" may include a reciprocal action or influence. An interaction can include a communication, contact, or exchange between parties, devices, and/or entities. Example interactions include a transaction between two parties and a data exchange between two devices. In some embodiments, an interaction can include a user requesting access to secure data, a secure webpage, a secure location, and the like. In other embodiments, an interaction can include a payment transaction in which two devices can interact to facilitate a payment. In some embodiments, an interaction can include a location access interaction.

"Interaction data" can include data related to and/or recorded during an interaction. In some embodiments, interaction data can be transaction data. Interaction data can include data that is used to process and complete an interaction. For example, interaction data can include an amount (e.g., transaction amount, amount of data, and amount of time, etc.). Interaction data can include transaction codes, currency codes, dates and/or times, resource provider identifiers, and/or any other suitable data utilized in an interaction. Interaction data can include a value or amount, information associated with a first party (e.g., an alias, identifiers, a contact address, etc.), information associated with a second party (e.g., an alias, a device identifier, a contact address, etc.), one-time values (e.g., a random value, a nonce, a timestamp, a counter, etc.), and/or any other suitable information.

An "authorization request message" may be an electronic message that requests authorization for an interaction. In some embodiments, it is sent to a network processing computer and/or an issuer of a payment card to request authorization for a transaction. An authorization request message according to some embodiments may comply with International Organization for Standardization (ISO) 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction value, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request message. In some cases, it may be an electronic message reply to an authorization request message generated by an issuing financial institution or a network processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the network processing computer) to the merchant's access device (e.g., POS equipment) that indicates approval of the transaction. The code may serve as proof of authorization.

An "authorizing entity" may be an entity that authorizes a request. Examples of an authorizing entity may be an issuer, a governmental agency, a document repository, an access administrator, etc. An authorizing entity may operate an authorizing entity computer. An "issuer" may refer to a business entity (e.g., a bank) that issues and optionally maintains an account for a user. An issuer may also issue payment credentials stored on a user device, such as a cellular telephone, smart card, tablet, or laptop to the consumer, or in some embodiments, a portable device.

A "resource provider" may be an entity that can provide a resource such as goods, services, information, and/or access. Examples of resource providers includes merchants, data providers, transit agencies, governmental entities, venue and dwelling operators, etc. A "merchant" may typically be an entity that engages in transactions and can sell goods or services, or provide access to goods or services.

An "authorization flag" can include a variable used to indicate a particular property of an authorization process. An authorization flag can be a Boolean value (e.g., 0 or 1, True or False, etc.). An authorization flag can indicate whether or not an interaction is authorized. For example, an authorization flag can indicate that an interaction is declined or the authorization flag can indicate that the interaction is authorized. In some embodiments, an authorization flag can be referred to as a fallback indicator (e.g., an indication that a first authorization was declined, and processing can fallback to utilization of a credential rather than a token).

A "response code" can include a sequence of words, letters, figures, or other symbols in response to a request. A response code can be generated in response to an authorization request message and can be included in an authorization response message. A response code can indicate a reason why an interaction is declined. For example, a response code can indicate that a token interaction is declined due to an incorrect cryptogram, an incorrect token, a missing data field, a fraudulent attempt, or any other suitable reason for declining the token interaction.

A "processor" may include a device that processes something. In some embodiments, a processor can include any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may comprise one or more computational apparatuses and may use any of a variety of computing structures, arrangements, and compilations for servicing the requests from one or more client computers.

Embodiments of the disclosure allow for a fallback or failsafe feature that allows for a subsequent request for a credential after a token interaction fails. A token requestor computer can request a credential after authorization of an interaction using a token fails. The credential can then be provided in a second authorization request message for authorization to an authorizing entity computer. However, plaintext holding of the credential by the token requestor computer may be restricted to situations in which a first authorization attempt fails. Thus, the token requestor computer has limited access to the credential. Further, after the token requestor computer utilizes the credential for interaction authorization, a network processing computer can monitor future interactions performed by the token requestor computer for the credential. If the token requestor computer later fraudulently or erroneously uses the credential, then network processing computer can decline the interaction authorization request.

For example, in various embodiments, a token provisioning and activation process can occur. For example, a token requestor initiates a token request for a first credential (e.g., a PAN). The first credential information is verified and stored in a database associated with a token provider computer, and can then be delivered to an authorizing entity for validation. A token is then generated by the token provider computer, and is then returned to the token requestors.

At any suitable point in time thereafter, a user initiates an interaction or the token requestor initiates a resource provider initiated interaction using the token. The token is accompanied by the relevant token cryptogram, which can be used to ensure that domain restriction controls can be applied. An authorization request message comprising the token, the cryptogram, and interaction data is sent from the token requestor computer to an authorizing entity computer via a network processing computer. The authorizing entity computer can decline the interaction for a specified reason (e.g., in a response code of "05"). For example, a decline response code of "05" can indicate that the token interaction is declined due to the submission of an incorrect cryptogram, etc.

The authorizing entity computer can then generate and transmit an authorization response message comprising an indication that the interaction was declined, and a response code to the token requestor computer. The token requestor computer can then send a new cryptogram request to the token provider computer that contains a token reference ID, the decline response code, and an authorization flag indicating that the interaction was declined. The authorization flag can also be characterized as a fallback indicator.

The token provider computer receives the request, validates that the previous cryptogram request was generated within a predetermined timeframe, and then retrieves the first credential from the database. The token provider computer then returns the first credential along with a new cryptogram to the token requestor computer. The newly generated cryptogram can contain the authorization flag in some embodiments. The new cryptogram can be generated based on a second credential associated with the first credential (e.g., an existing card verification value). A cryptogram that is generated by encrypting input data can be said to be a cryptogram generated based on the input data.

The token requestor computer can then transmit a second authorization request message comprising the first credential and new cryptogram for the interaction to the network processing computer, where the new cryptogram is validated. In some embodiments, the network processing computer can insert an authorization flag in the second authorization request message, which is subsequently transmitted to the authorizing entity computer.

The authorizing entity computer then receives the second authorization request message with the first credential and the new cryptogram. The authorizing entity computer then has knowledge that the current interaction is a "fallback" interaction from a specific token requestor, and then makes a relevant authorization decision. The authorizing entity computer can then transmit a second authorization response message back to the network processing computer, which then provides the second authorization response message to the token requestor computer.

The network processing computer then monitors the token requestor computer to ensure that no additional interaction messages are received without an appropriate cryptogram and message content. It will otherwise not allow the use of the first credential by the token requestor computer.

FIG. 1 shows a system 100 according to embodiments of the disclosure. The system 100 comprises a user device 102, a resource provider computer 104, a token requestor computer 106, a token provider computer 108, a transport computer 110, a network processing computer 112, and an authorizing entity computer 114. In some embodiments, the token requestor computer 106 and the resource provider computer 104 can be included in a single computer (in some embodiments, collectively referred to as a token requestor computer 120) capable of performing the processes performed by both the token requestor computer 106 and the resource provider computer 104. For example, a resource provider can also be a token requestor.

The user device 102 can be in operative communication with the token requestor computer 106 and the resource provider computer 104. The token requestor computer 106 can be in operative communication with the token provider computer 108 and the resource provider computer 104. The transport computer 110 can be in operative communication with the resource provider computer 104 and the network processing computer 112. The network processing computer 112 can be in operative communication with the token provider computer 108 and the authorizing entity computer 114.

For simplicity of illustration, a certain number of components are shown in FIG. 1. It is understood, however, that embodiments of the invention may include more than one of each component. In addition, some embodiments of the invention may include fewer than or greater than all of the components shown in FIG. 1.

Messages between at least the devices in system 100 in FIG. 1 can be transmitted using a secure communications protocols such as, but not limited to, File Transfer Protocol (FTP); HyperText Transfer Protocol (HTTP); Secure Hypertext Transfer Protocol (HTTPS), SSL, ISO (e.g., ISO 8583) and/or the like. The communications network may include any one and/or the combination of the following: a direct interconnection; the Internet; a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a Wireless Application Protocol (WAP), I-mode, and/or the like); and/or the like. The communications network can use any suitable communications protocol to generate one or more secure communication channels. A communications channel may, in some instances, comprise a secure communication channel, which may be established in any known manner, such as through the use of mutual authentication and a session key, and establishment of a Secure Socket Layer (SSL) session.

The user device 102 can include any suitable user device (e.g., laptop computer, mobile phone, etc.). The user of the user device 102 can perform an interaction with a resource provider of the resource provider computer 104 to obtain access to a resource. The interaction can be initiated by either the user or the resource provider. To complete the interaction, the interaction can be authorized by the authorizing entity computer 114. The resource provider computer 104 in conjunction with a token requestor computer 106 can request tokens from a token provider computer 108. The token can be associated with a first credential of the user. For example, the user can have a first credential that is a primary account number (PAN). The PAN is associated with a token stored by the token provider computer 108 or a token database in operative communication (not shown) with the token provider computer 108.

The token provider computer 108 can transmit a token and a cryptogram associated with the token to the token requestor computer 106 for an interaction. For example, the token requestor computer 106 can obtain user identifying information (e.g., the first credential, a user identifier, etc.), which can be provided to the token provider computer 108 to request a specific token of the user. Upon receiving the token, the token requestor computer 106 and/or the resource provider computer 104 can generate an authorization request message comprising interaction data of the interaction and the token and the cryptogram. The authorization request message can be provided to the authorizing entity computer 114 via the transport computer 110 and the network processing computer 112.

The authorizing entity computer 114 can be configured to determine whether or not to authorize an interaction. The authorizing entity computer 114 can determine to decline the interaction and then generate an authorization response message comprising an indication that the interaction is declined and a response code. The response code indicates a reason why the interaction is declined. The response code can be a numeric value, where the value pertains to a reason. For example, the response code can be "05," which indicates that the interaction is declined due to a faulty cryptogram. For example, the cryptogram can be expired or incorrect. As another example, the response code can indicate that the interaction is highly likely to be fraudulent.

The authorizing entity computer 114 can transmit the authorization response message to the resource provider computer 104 via the transport computer 110 and the network processing computer 112. The resource provider computer 104 can transmit the authorization response message that indicates a declined interaction to the token requestor computer 106.

The token requestor computer 106 can be configured to request a second cryptogram from the token provider computer 108, and then transmit the second cryptogram and other associated data, as described in further detail herein, in a second authorization request message to the authorizing entity computer 114 via the resource provider computer 104, transport computer 110, and the network processing computer 112.

Figure 2:
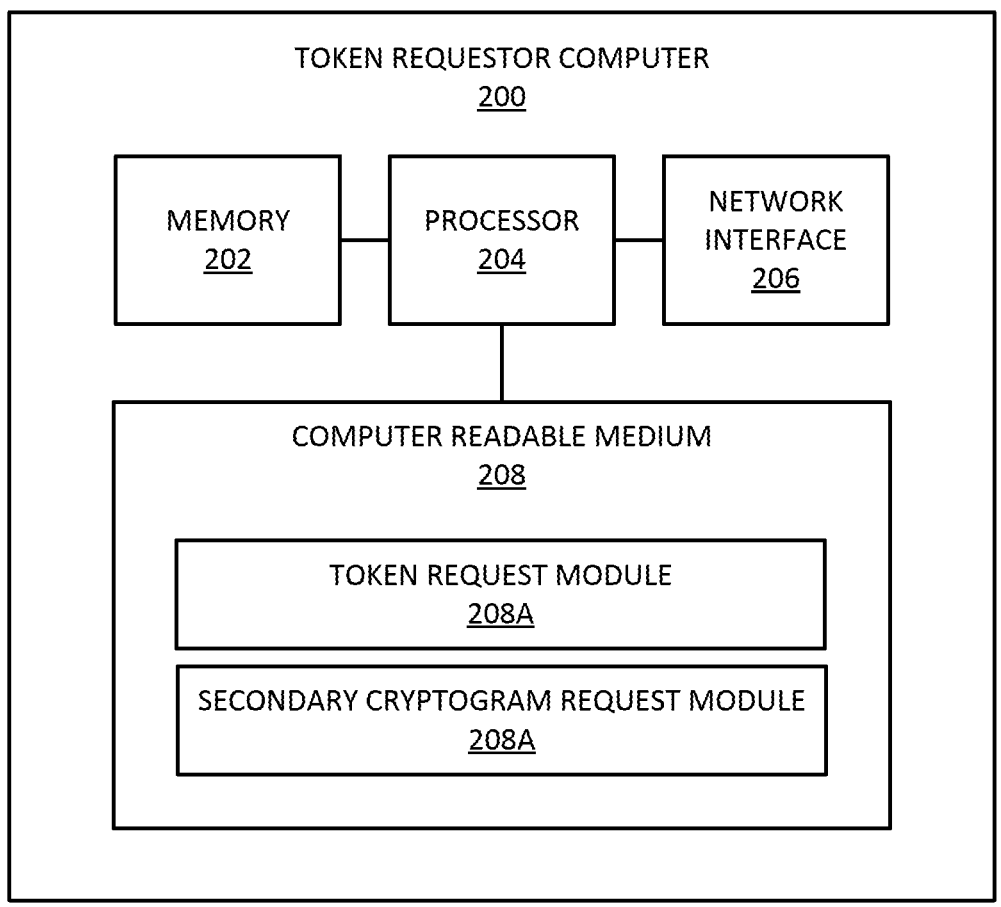
FIG. 2 shows a block diagram of components of a token requestor computer according to embodiments.

FIG. 2 shows a block diagram of a token requestor computer 200 according to embodiments. The exemplary token requestor computer 200 may comprise a processor 204. The processor 204 may be coupled to a memory 202, a network interface 206, and a computer readable medium 208. The computer readable medium 208 can comprise a token request module 208A and a secondary cryptogram request module 208B.

The memory 202 can be used to store data and code. The memory 202 may be coupled to the processor 204 internally or externally (e.g., cloud based data storage), and may comprise any combination of volatile and/or non-volatile memory, such as RAM, DRAM, ROM, flash, or any other suitable memory device. For example, the memory 202 can store tokens, interaction data, authorization flags, response codes, etc.

The computer readable medium 208 may comprise code, executable by the processor 204, for performing a method comprising: transmitting, by a token requestor computer, a first authorization request message comprising a token and a first cryptogram for authorization of an interaction between a user and a resource provider to a server computer, wherein the token is associated with a credential; receiving, by the token requestor computer, a first authorization response message comprising a response code from the server computer; responsive to receiving the first authorization response message, generating, by the token requestor computer, a cryptogram request message comprising the token or a token identifier associated with the token and the response code; transmitting, by the token requestor computer, the cryptogram request message to a token provider computer, wherein the token provider computer generates a second cryptogram, and provides the second cryptogram and the credential to the token requestor computer; receiving, by the token requestor computer, the second cryptogram and the credential from the token provider computer; generating, by the token requestor computer, a second authorization request message comprising the second cryptogram and the credential; transmitting, by the token requestor computer, the second authorization request message to the server computer for the interaction; and receiving a second authorization response message from the server computer in response to the second authorization request message, the second authorization response message indicating whether the interaction is authorized.

The token request module 208A may comprise code or software, executable by the processor 204, for requesting tokens from a token provider computer. The token request module 208A, in conjunction with the processor 204, can generate a token request message for requesting a token from the token provider computer 108. The token request module 208A, in conjunction with the processor 204, can generate the token request message to comprise a credential, user identifier, or any other user identifying information received from the resource provider computer 104, the user device 102, or stored in the memory 202 of the token requestor computer 200.

In some embodiments, in response to the token request message, the token requestor computer 200 can receive, from the token provider computer, the token, a token identifier, a cryptogram, and/or other data associated with the aforementioned data items, such as expiration dates, etc.

The secondary cryptogram request module 208B may include may comprise code or software, executable by the processor 204, for requesting second cryptograms. The secondary cryptogram request module 208B, in conjunction with the processor 204, can generate a second cryptogram request message after a first authorization request message for authorization of an interaction has been declined. The secondary cryptogram request module 208B, in conjunction with the processor 204, can generate a second cryptogram request message comprising a token identifier associated with the token, the response code, and an authorization flag that indicates that the interaction is declined. The secondary cryptogram request module 208B, in conjunction with the processor 204, can retrieve the response code and the authorization flag from the authorization response message than indicates that the interaction is declined.

In some embodiments, the secondary cryptogram request module 208B, in conjunction with the processor 204, can create and set an authorization flag to indicate that the interaction is declined, then include the authorization flag into the second cryptogram request message.

The network interface 206 may include an interface that can allow the token requestor computer 200 to communicate with external computers. The network interface 206 may enable the token requestor computer 200 to communicate data to and from another device (e.g., a token provider computer a resource provider computer, etc.). Some examples of the network interface 206 may include a modem, a physical network interface (such as an Ethernet card or other Network Interface Card (NIC)), a virtual network interface, a communications port, a Personal Computer Memory Card International Association (PCMCIA) slot and card, or the like. The wireless protocols enabled by the network interface 206 may include Wi-Fi™. Data transferred via the network interface 206 may be in the form of signals which may be electrical, electromagnetic, optical, or any other signal capable of being received by the external communications interface (collectively referred to as "electronic signals" or "electronic messages"). These electronic messages that may comprise data or instructions may be provided between the network interface 206 and other devices via a communications path or channel. As noted above, any suitable communication path or channel may be used such as, for instance, a wire or cable, fiber optics, a telephone line, a cellular link, a radio frequency (RF) link, a WAN or LAN network, the Internet, or any other suitable medium.

Figure 3:
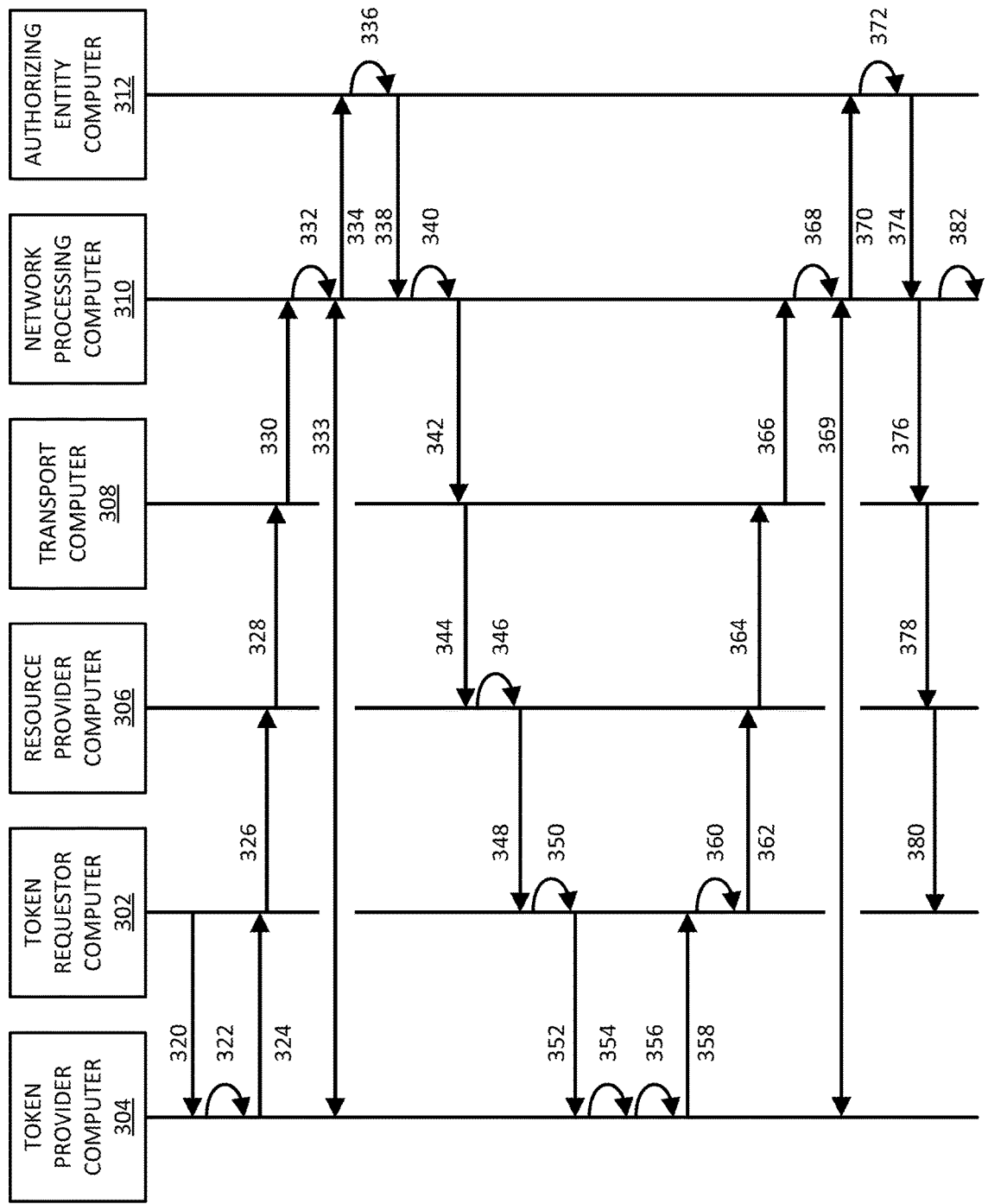
FIG. 3 shows a flow diagram illustrating a token processing method according to embodiments.

FIG. 3 shows a flow diagram illustrating a token processing method according to embodiments. The method illustrated in FIG. 3 will be described in the context of a user and a resource provider performing an interaction such as a payment transaction. The interaction can be initiated by either the resource provider or the user. In some embodiments, a first authorization request message including a token can be declined by an authorizing entity computer. The system can be configured such that a fallback process of providing a second authorization request message to the authorizing entity computer can be performed in the event that the first authorization request message fails.

Prior to step 320, a user can conduct an interaction with a resource provider (e.g., a merchant) using the user device. The interaction can be a payment transaction (e.g., for the purchase of a good or service), an access transaction (e.g., for access to a transit system), or any other suitable transaction. The user can utilize the user device to indicate payment account information to the resource provider electronically, such as in an online transaction. In some cases, the user device may send a request to the token requestor computer 302 to request a token for the interaction. In other cases, the user device may send a request to the resource provider computer 306. In response, the resource provider computer 306 can communicate with the token requestor computer 302 to request a token for the interaction.

At step 320, the token requestor computer 302 can request a token from the token provider computer 304. The token requestor computer 302 can request a token that is associated with the user of the user device or a payment device associated with the user. For example, in some embodiments, the token requestor computer 302 can receive a credential, user identifier, or any other user identifying information from the user device, which can be provided to the token provider computer 304. The token provider computer 304 can determine the appropriate token based on the user identifying information.

At step 322, the token provider computer 304 can determine the token associated with the user, and then at step 324 transmit the token to the token requestor computer 302. In some embodiments, the token provider computer 304 can generate the token using an algorithm. In other embodiments, the token provider computer 304 can retrieve the token from a database.

The token provider computer 304 can also transmit a cryptogram associated with the token to the token requestor computer 302 along with the token. In some embodiments, the token provider computer 304 can also transmit a token identifier that identifies the token to the token requestor computer 302. The token identifier may be a supplemental value of any suitable number of characters that may be linked to a token, but is not the token and is not the credential specifically associated with the token.

In some embodiments, the token provider computer 304 can store a time and date associated with the transmission of the token and the cryptogram to the token provider computer 304. This can be done so that any subsequent token and cryptogram request is not subsequently fraudulently replayed after an unreasonable period time.

At step 326, upon receiving the token from the token provider computer 304, the token requestor computer 302 can transmit the token to the resource provider computer 306. In some embodiments, when the resource provider computer 306 and the token requestor computer 302 are integrated into a single computer (e.g., the token requestor computer 120 or 402 of FIGS. 1 and 4, respectively), the token requestor computer 120 can generate an authorization request message. The authorization request message can comprise the token and the cryptogram (e.g., a first cryptogram) for authorization of the interaction between the user and the resource provider. After generating the authorization request message (e.g., a first authorization request message), the token requestor computer can provide the authorization request message to a server computer. The server computer can include the authorizing entity computer 312. A message provided from the token requestor computer 302 to the server computer (e.g., the authorizing entity computer 312) can be provided via any other computer (e.g., the resource provider computer 306, the transport computer 308, and/or the network processing computer 310). In particular, the token requestor computer can transmit the first authorization request message to the server computer that is the network processing computer 310 and the authorizing entity computer 312. The first authorization request message can be transmitted to the authorizing entity computer 312 via the network processing computer 310, as described in reference to steps 326-334.

For example, in order to authorize the interaction, the authorization request message is generated by the token requestor computer 302 or the resource provider computer 306 and then forwarded, at step 328, to the transport computer 308. The authorization request message can include the token and the cryptogram. The authorization request message can further include any interaction data associated with the interaction. Such interaction data may comprise, for example, a transaction channel indicator (e.g., an e-commerce transaction channel, or a physical point of sale transaction channel), an amount, a resource provider identifier, a date, a time, etc.

At step 330, after the transport computer 308 receives the authorization request message, the transport computer 308 sends the authorization request message to the network processing computer 310.

At step 332, after receiving the authorization request message, the network processing computer 310 can determine a credential associated with the token. For example, at step 333, the network processing computer 310 can send a credential request to the token provider computer 304. The credential request can include the token, the cryptogram, and the transaction channel indicator. After receiving the credential request, the token provider computer 304 can determine the credential associated with the token and also determine if the cryptogram was previously issued and is associated with the correct transaction channel. The token provider computer 304 can then transmit a credential response to the network processing computer 310. The credential response can include the credential, the cryptogram, and an indication that the token was used in the correct transaction channel. After receiving the credential associated with the token, the network processing computer 310 can insert the credential, and optionally the cryptogram and the indication that the token was used in the correct transaction channel, into the authorization request message. For example, the authorization request message can then include both the token and the credential associated with the token.

At step 334, after obtaining the credential, the network processing computer 310 can then transmit the authorization request message to the corresponding authorizing entity computer 312 associated with an authorizing entity that manages the user's account.

At step 336, after the authorizing entity computer 312 receives the authorization request message, the authorizing entity computer 312 can determine whether or not to authorize the interaction between the user and the resource provider. In this example, the authorizing entity computer 312 can decline the interaction. The authorizing entity computer 312 can determine a response code that indicates a reason why the interaction is declined. The response code can be an alphanumeric value such as 05, ABCD, DC01, etc. The token based interaction can be declined for any suitable reason. For example, the response code can indicate that the interaction is declined due to an incorrect cryptogram, a token that does not match the credential associated with the correct user, an expired cryptogram, an expired token, a fraudulent interaction attempt, etc. In other cases, the interaction can be declined for the lack of funds associated with the account or a high likelihood of fraud.

The authorizing entity computer 312 then generates an authorization response message that includes an indication that the interaction is declined and the response code, as well as the token, the credential, the interaction data, and/or the cryptogram.

At step 338, after generating the authorization response message, the authorizing entity computer 312 then provides the authorization response message to the network processing computer 310.

At step 340, the network processing computer 310 can evaluate the authorization response message to determine whether or not the authorizing entity computer 312 authorized the interaction. The network processing computer 310 can remove the credential from the authorization response message, so that the authorization response message contains the token, but does not contain the credential.

At step 342, the network processing computer 310 can then transmit the authorization response message to the transport computer 308.

At step 344, after receiving the authorization response message, the transport computer 308 can transmit the authorization response message to the resource provider computer 306.

At step 346, after receiving the authorization response message from the server computer (e.g., the authorizing entity computer 312 via the network processing computer 310), the resource provider computer 306 can evaluate the authorization response message to determine whether or not the interaction was authorized by the authorizing entity computer 312. In this example, the authorization response message includes an indication that the interaction is declined and a response code. The resource provider computer 306, if the interaction is declined, can transmit the authorization response message to the token requestor computer 302, at step 348.

At step 350, the token requestor computer 302 can receive the authorization response message comprising the response code that indicates the reason why the interaction is declined. Responsive to receiving the authorization response message (e.g., the first authorization response message) from the server computer, the token requestor computer 302 can generate a second cryptogram request message comprising a token identifier associated with the token, the response code, and an authorization flag that indicates that the interaction was declined. The token identifier can be any suitable unique identifier that identifies the token. For example, the token identifier can be an alphanumeric value. The authorization flag can indicate if the interaction is authorized or if the authorization is not authorized. For example, the authorization flag can be a Boolean value set by the token requestor computer 302 based on the indication of whether or not the interaction is authorized retrieved from the authorization response message.

At step 352, the token requestor computer 302 can transmit the second cryptogram request to the token provider computer 304 to request a second cryptogram (e.g., second to the previously utilized token and cryptogram). The second cryptogram may be different than the first cryptogram, but may use some of the same data elements as inputs (e.g., the token). Data elements that may be included in the second cryptogram that may not be present in the previously described first cryptogram may include the authorization flag (e.g., a fallback indicator). In some embodiments, the second cryptogram request can be referred to as a fallback cryptogram request.

At step 354, after receiving the second cryptogram request, the token provider computer 304 can validate that the previous cryptogram was generated within a predefined timeframe. For example, the token provider computer 304 can determine a length of time between providing the token and cryptogram to the token requestor computer 302 and receiving the second cryptogram request. The token provider computer 304 then compares the determined length of time to the predefined timeframe to determine whether or not to generate a new cryptogram to transmit to the token requestor computer 302. For example, the predefined timeframe can be 10 minutes, 1 hour, 6 hours, 1 day, etc.

In some embodiments, the token provider computer 304 can determine whether or not to provide a new cryptogram to the token requestor computer 302 based on the response code. The token provider computer 304 can store a table indicating response codes for which a new cryptogram can be generated. For example, a response code that indicates a fraudulent transaction attempt (e.g., a response code of "F1") can be stored in the table with instructions not to provide a new cryptogram. This can be done, such that likely fraudulent transactions and known fraudulent transactions will not be reattempted with the new cryptogram. Another response code can indicate that the formatting of the first authorization request message was incorrect (e.g., a response code of "998"). This response code can be stored in the table with instructions to provide the new cryptogram.

At step 356, if the determined length of time is a value that is less than the predefined timeframe (e.g., less than 5 or 10 minutes), then the token provider computer 304 generates a new cryptogram (e.g., a second cryptogram). The token provider computer 304 can generate the second cryptogram based on the authorization flag (e.g., that indicates that the interaction is not authorized) and a second credential. The second cryptogram that is generated by encrypting input data can be said to be a second cryptogram that is generated based on the input data. The second credential can be associated with the token, but may be a different credential than the first credential. For example, the first credential can be a PAN, whereas the second credential can be a dCVV.

As an illustrative example, the token provider computer 304 can generate the second cryptogram by encrypting input data with an encryption key, such as a symmetric encryption key. The symmetric encryption key can be stored by both the token provider computer 304 and the network processing computer 310 prior to the steps depicted in FIG. 3, and may be updated with new symmetric encryption keys periodically. In some embodiments, the second cryptogram can be formed by encrypting the input data with other types of cryptographic keys including unique derived keys, a public/private key pair, etc.

The inputs to the second cryptogram can differ from the inputs to the first cryptogram. For example, the inputs to the second cryptogram can include the second credential and the authorization flag in addition to or instead of the inputs used to create the first cryptogram. However, it is understood that other data can be included as input, such as a counter or a time of day, to prevent replay attempts (e.g., where a resource provider or token requestor attempts to reuse a cryptogram for additional interactions).

As an additional example, the token provider computer 304 can encrypt input data including the response code, the second credentials, and a counter. The inclusion of the response code into the second cryptogram can link the second cryptogram to the reason why the interaction was declined. The inclusion of the second credentials into the second cryptogram can link the second cryptogram to the user that is associated with the second credentials. The inclusion of the counter into the second cryptogram can link the second cryptogram to the present interaction since each interaction performed can result in incrementing the counter by one (or other suitable amount). By including the counter, the second cryptogram cannot be used by the token requestor in additional interactions. The counter can be a counter associated with the token requestor computer 302 and can be increased each time a interaction is performed by the token requestor computer 302.

At step 358, after generating the second cryptogram, the token provider computer 304 provides the second cryptogram to the token requestor computer 302 via a second cryptogram response message. In some embodiments, the token provider computer 304 can further transmit the first credential to the token requestor computer 302 along with the second cryptogram.

At step 360, after receiving the second cryptogram and the first credential, the token requestor computer 302 generates a second authorization request message comprising the second cryptogram and the first credential. The second authorization request message can further include any combination of the following: the authorization flag, the response code, and/or the interaction data. In some embodiments, such interaction data may comprise, for example, a transaction channel indicator (e.g., an e-commerce transaction channel, or a physical point of sale transaction channel), an amount, a resource provider identifier, a date, a time, etc. In some embodiments, at step 362, the token requestor computer 302 can transmit the second cryptogram and the first credential to the resource provider computer 306. After receiving the first credential and the second cryptogram, the resource provider computer 306 can then generate the second authorization request message comprising the first credential and the second cryptogram.

At step 364, the token requestor computer 302, or the resource provider computer 306, can then transmit the second authorization request message to the server computer (e.g., the authorizing entity computer 312) via at least the transport computer 308.

At step 366, after receiving the second authorization request message, the transport computer 308 then transmits the second authorization request message to the network processing computer 310.

At step 368, After receiving the second authorization request message, the network processing computer 310 can validate the second cryptogram. For example, the network processing computer 310 can generate a verification cryptogram based on the same data used to generate the second cryptogram (e.g., based on a second credential, the authorization flag, the response code, etc.). The network processing computer 310 can compare the verification cryptogram to the received second cryptogram. If the verification cryptogram matches the second cryptogram, then the second cryptogram is valid. In some embodiments, the network processing computer 310 can insert an authorization flag indicating that the first authorization request message for the interaction was declined, if no authorization flag is presently included in the second authorization request message.

As an illustrative example, the network processing computer 310 can generate the verification cryptogram by encrypting input data with an encryption key, such as a symmetric encryption key. The symmetric encryption key can be the same symmetric encryption key used by the token provider computer 304 to form the second cryptogram.

The network processing computer 310 can retrieve and/or generate the input data to utilize to generate the verification cryptogram. For example, the input data can include the second credential and the authorization flag. The network processing computer 310 can determine that the second authorization request is a fallback authorization request after the first authorization request was declined. The network processing computer 310 can generate the authorization flag to indicate that the interaction was declined (e.g., as was indicated in the first authorization response message). For example, the network processing computer 310 can generate the authorization flag to be a value of "1," which can indicate that the first authorization request message was declined.

The network processing computer 310 can also obtain the second credential from a database maintained by the network processing computer 310. For example, the network processing computer 310 can have access to a plurality of second credentials (e.g., dCVV's). The network processing computer 310 can determine which stored second credential is associated with the first credential and/or the user.

In some embodiments, the second credential may be stored and maintained in a database by the token provider computer 304. At step 369, the network processing computer 310 can request the second credential from the token provider computer 304 in a second credential request message. The second credential request can include the credential, the second cryptogram, and/or the transaction channel indicator. After receiving the second credential request message, the token provider computer 304 can determine the second credential in response to the second credential request message. The token provider computer 304 can also determine if the second cryptogram was previously issued and is associated with the correct transaction channel based on the transaction channel indicator. The token provider computer 304 can then transmit a second credential response message to the network processing computer 310. The second credential response message can include the second credential, the second cryptogram, and an indication that the credential (e.g., the PAN) was used in the correct transaction channel.

After receiving the credential associated with the token, the network processing computer 310 can insert the credential, and optionally the cryptogram and the indication that the token was used in the correct transaction channel, into the authorization request message. For example, the authorization request message can then include both the token and the credential associated with the token.

After obtaining the input data for the verification cryptogram, the network processing computer 310 can generate the verification cryptogram by encrypting the authorization flag and the second credential with the symmetric encryption key (e.g., which is the same symmetric encryption key utilized by the token provider computer 304 to form the second cryptogram).

In some embodiments, the network processing computer 310 can determine a counter or a time to include in the input data for the verification cryptogram. By including the counter of the time, the network processing computer 310 can catch a replay attempt of the second cryptogram. The counter can be included as input data by both the network processing computer 310 and the token provider computer 304 to the verification cryptogram and the second cryptogram, respectively.

After generating the verification cryptogram, the network processing computer 310 can compare the verification cryptogram to the second cryptogram. If the second cryptogram matches the verification cryptogram then the second cryptogram was authentically created and is not a reused cryptogram (e.g., in a replay attempt). For example, a fraudulent token requestor may attempt to perform a fraudulent interaction using the first credential (e.g., a PAN) and the cryptogram. However, the cryptogram would be expired (e.g., due to a counter included in the creation of the cryptogram, a time including in the creation of the cryptogram, etc.), thus the verification cryptogram generated by the network processing computer 310 with the correct counter or time would not match the received cryptogram. By having the network processing computer 310 validate the second cryptogram, fraudulent attempts with the credential can be terminated as they occur.

At step 370, after validating the second cryptogram, the network processing computer 310 can then transmit the second authorization request message to the authorizing entity computer 312. In some embodiments, prior to transmitting the second authorization request message, the network processing computer 310 can insert the second credential, and optionally the indication that the first credential was used in the correct transaction channel, into the second authorization request message. For example, the authorization request message can then include both the first credential and the second credential associated with the token included in the first authorization request message.

At step 372, after receiving the second authorization request message, the authorizing entity computer 312 determines whether or not to authorize the interaction. For example, the authorizing entity computer 312 can determine whether or not to authorize the interaction based on the interaction data, the second cryptogram, the first credential, the authorization flag, and/or any other data included in the second authorization request message or stored by the authorizing entity computer 312. For example, the authorizing entity computer 312 can retrieve the previously determined and stored response code indicating why the interaction is declined. The authorizing entity computer 312 can then generate a second authorization response message. The second authorization response message can include an indication of whether or not the interaction is authorized. The second authorization response message can further comprise the second cryptogram, the first credential, and the interaction data.

In some embodiments, the authorizing entity computer 312 can authorize the interaction (e.g., the transaction) using the first credential (e.g., the PAN). For example, the authorizing entity computer 312 can maintain one or more accounts associated with the user. The first credential can correspond to at least one account. The authorizing entity computer 312 can authorize the transaction based on an amount in the account (e.g., funds of the account). For example, if the account associated with the PAN has more funds that requested in the interaction data of the second authorization request message, then the authorizing entity computer 312 can authorize the transaction.

In some embodiments, the authorizing entity computer 312 can evaluate the account determined using the first credential for fraud in any suitable manner. For example, the user of the account may have notified the authorizing entity computer 312 that the user's mobile device was stolen and that any transaction performed with the user's mobile device is fraudulent. In some embodiments, the authorizing entity computer 312 can evaluate the user's account history and habits to determine if the current authorization request is a fraudulent authorization request.

At step 374, after generating the second authorization response message, the server computer (e.g., the authorizing entity computer 312) transmits the second authorization response to the token requestor computer 302. The second authorization response can be transmitted from the server computer to the token requestor computer 302 via any other suitable computers depicted in FIG. 3. For example, the authorizing entity computer 312 can provide the second authorization response message to the network processing computer 310.

At step 376, after receiving the second authorization response message, the network processing computer 310 provides the second authorization response message to the transport computer 308. In some embodiments, network processing computer 310 may decline the transaction even if the authorizing entity computer 312 has authorized the transaction, for example depending on a value of the fraud risk score.

At step 378, the transport computer 308 provides the second authorization response message to the resource provider computer 306. In some embodiments, after the resource provider computer 306 receives the second authorization response message, the resource provider computer 306 may then transmit the second authorization response message to the user. For example, the resource provider may provide a web page or other indication of the second authorization response message as a virtual receipt. The receipts may include interaction data for the interaction.

In some embodiments, at step 380, the resource provider computer 306 can transmit the second authorization response message to the token requestor computer 302. As such, the token requestor computer 302 can receive the second authorization response message from the server computer in response to the second authorization request message. The token requestor computer 302 can then then erase the first credential from its memory (e.g., delete).

In some embodiments, at the end of the day, a normal clearing and settlement process can be conducted by the network processing computer 310, the resource provider computer 306, and the authorizing entity computer 312. A clearing process is a process of exchanging financial details between an acquirer and an authorizing entity to facilitate posting to a user's payment account and reconciliation of the user's settlement position.

At step 382, the network processing computer 310 can monitor subsequent authorization request messages for the first credential. For example, the network processing computer 310 can determine if a subsequently received authorization request message includes the first credential and originates from the token requestor computer 302. For example, a fraudulent token requestor may attempt to perform a fraudulent interaction using the first credential and the cryptogram. However, the cryptogram would be expired (e.g., due to a counter included in the creation of the cryptogram, a time including in the creation of the cryptogram, etc.). By having the network processing computer 310 monitor for the first credential, future fraudulent attempts with the first credential can be terminated as they occur. As such, the providing of the first credential and the second cryptogram to the token requestor computer 302 at step 358 is secure because the token requestor computer 302 cannot fraudulently reuse or misuse the first credential.

Figure 4:
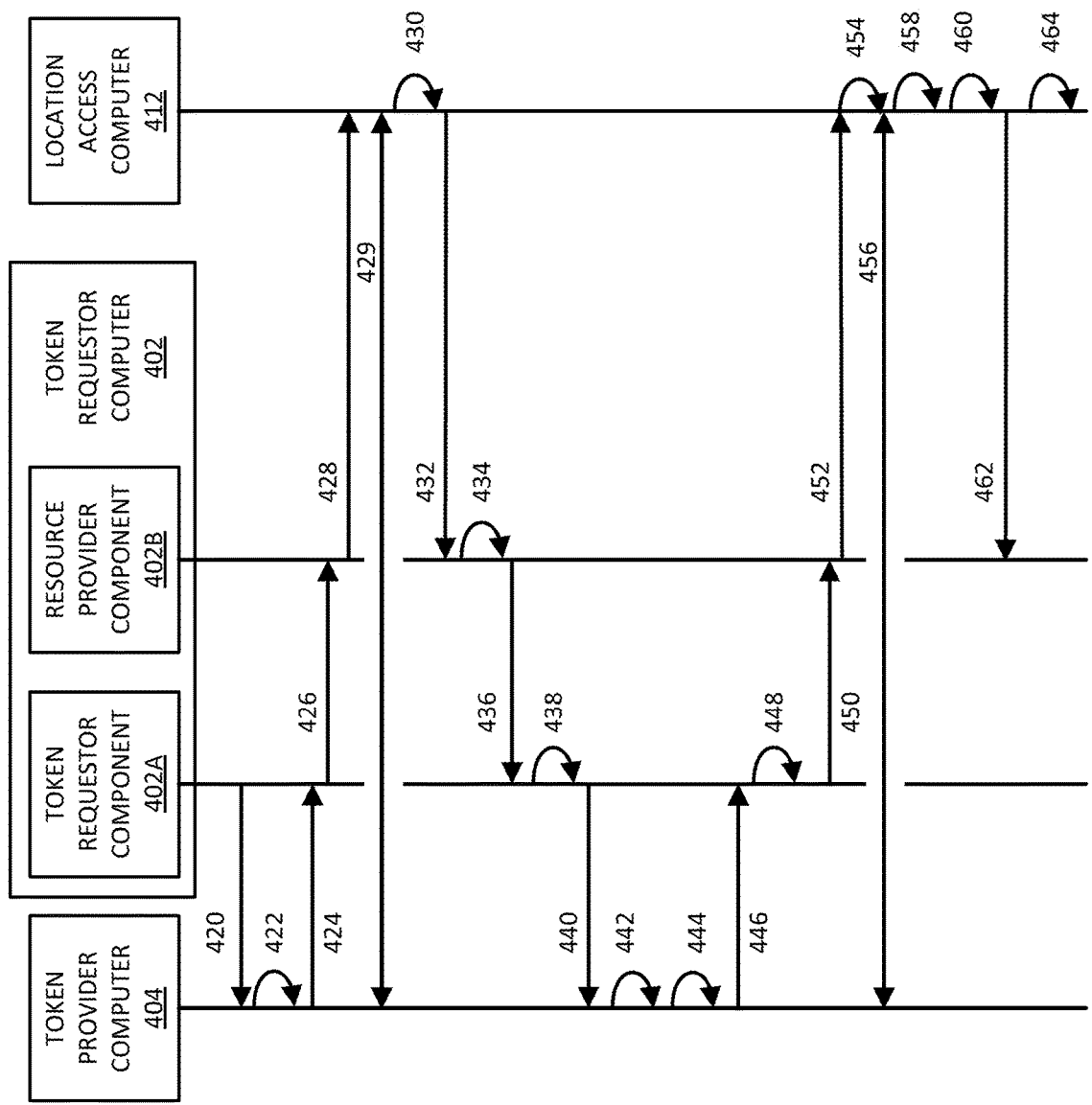
FIG. 4 shows a flow diagram illustrating a secure location access method according to embodiments.

Embodiments of the invention are not limited to financial transactions, but can also be used to conduct access transactions. For example, FIG. 4 shows a flow diagram illustrating a secure location access method according to embodiments. The method illustrated in FIG. 4 will be described in the context of a user requesting access to a secure location (e.g., a locked building). It is understood, however, that the invention can be applied to other circumstances (e.g., the user can request access to a transit location, an office, data, a secure webpage, a file cabinet, etc.) in which the ability to access a resource can be authorized. The location access computer 412 of FIG. 4 can be an authorizing entity computer.

Prior to step 420, a user can conduct an interaction with a resource provider (e.g., a location access provider) using a user device. The interaction can be an access interaction for the user to obtain access to a secure building. The user can utilize the user device to indicate interaction data to the resource provider electronically, such as in an online interaction. In some cases, the user device may send a request to the token requestor computer 402 to request a token for the interaction.

At step 420, the token requestor component 402A of the token requestor computer 402 can request a token from the token provider computer 404. The token requestor component 402A can request a token that is associated with the user which can indicate that the user is allowed to access a particular location. In some embodiments, the token requestor component 402A can receive a credential, user identifier, or any other user identifying information such as a user biometric data from the user device, which can be provided to the token provider computer 404. The token provider computer 404 can determine the appropriate token based on the user identifying information.

At step 422, the token provider computer 404 can determine the token associated with the user, and then at step 424 transmit the token to the token requestor component 402A. In some embodiments, the token provider computer 404 can transmit a cryptogram associated with the token to the token requestor component 402A along with the token. In other embodiments, the token provider computer 404 can also transmit a token identifier to the token requestor component 402A of the token requestor computer 402. The token identifier can be a unique identifier for the token.

At step 426, upon receiving the token from the token provider computer 404, the token requestor component 402A can transmit the token to the resource provider component 402B. In some embodiments, when the resource provider component 402B and the token requestor component 402A are integrated into a single computer (e.g., the token requestor computer 402), the token requestor computer 402 can generate an authorization request message. For example, in order to authorize the access interaction, the authorization request message is generated by the token requestor component 402A or the resource provider component 402B and then forwarded, at step 428, to the location access computer 412. The authorization request message can include the token and the cryptogram. The authorization request message can further include any interaction data associated with the interaction, for example, building number, door number, amounts, resource provider identifiers, user identifiers dates, times, etc.

At step 429, the location access computer 412 can send a credential request to the token provider computer 404 to obtain the credential associated with the token. The credential request can include the token, the cryptogram, and in some embodiments, a channel indicator. The channel indicator can indicate a particular channel that the token can be utilized within (e.g., from an interaction originating from a key card, a mobile phone, a computer, etc.). After receiving the credential request, the token provider computer 404 can determine the credential associated with the token and also determine if the cryptogram was previously issued and is associated with the correct channel. The token provider computer 404 can then transmit a credential response to the network processing computer 410. The credential response can include the credential, the cryptogram, and an indication that the token was used in the correct channel.

At step 430, after receiving the authorization request message that requests authorization for the user to access the secure building, the location access computer 412 can determine whether or not to authorize the access interaction. For example, the location access computer 412 can determine that the cryptogram is expired and thus cannot authorize the interaction. The location access computer 412 can generate a response code of, for example, "DC11" that indicates that the interaction is declined because the cryptogram is expired.

In some embodiments, the location access computer 412 can request the credential associated with the token from the token provider computer 404 in communication with the token provider computer 404 and the location access computer 412. Upon receiving the credential associated with the token, the location access computer 412 determines whether or not the credential is sufficient for the user to access the secure location.

The location access computer 412 then creates an authorization response message comprising the interaction data, the cryptogram, and the response code. At step 432, the location access computer 412 provides the authorization response message to the token requestor computer 402.

At step 434, the resource provider component 402B can evaluate the authorization response message to determine whether or not the interaction was authorized by the location access computer 412. In this example, the authorization response message includes at least an indication that the interaction is declined and the response code. The resource provider component 402B, if the interaction is declined, can transmit the authorization response message to the token requestor component 402A, at step 436.

At step 438, the token requestor component 402A can receive the authorization response message comprising the response code that indicates the reason why the interaction is declined. The token requestor component 402A can generate a second cryptogram request message comprising a token identifier associated with the token, the response code, and an authorization flag that indicates that the interaction is declined. The token identifier can be retrieved from memory after having been stored after step 424. The authorization flag can indicate if the interaction is authorized or if the authorization is not authorized. For example, the authorization flag can be a Boolean value set by the token requestor component 402A based on the indication of whether or not the interaction is authorized retrieved from the authorization response message.

At step 440, the token requestor component 402A can transmit the second cryptogram request to the token provider computer 404 to request a second cryptogram (e.g., second to the previously utilized token and cryptogram). In some embodiments, the second cryptogram request can be referred to as a fallback cryptogram request. The token requestor component 402A can also transmit the cryptogram in the second cryptogram request.

At step 442, after receiving the second cryptogram request, the token provider computer 404 can validate that the previous cryptogram was generated within a predefined timeframe. For example, the token provider computer 404 can determine a length of time between providing the token and cryptogram to the token requestor computer 402 and receiving the second cryptogram request. The token provider computer 404 then compares the determined length of time to the predefined timeframe to determine whether or not to generate a new cryptogram to transmit to the token requestor computer 402. For example, the predefined timeframe can be 10 minutes, 1 hour, 6 hours, 1 day, etc.

In some embodiments, the received second cryptogram request includes the cryptogram. The token provider computer 404 can validate the cryptogram, for example, by determining that the received cryptogram is the same cryptogram as the provided cryptogram at step 424. Further, the token provider computer 404 can cryptographically validate the cryptogram in any suitable manner.

At step 444, if the determined length of time is a value that is less than the predefined timeframe, then the token provider computer 404 generates a new cryptogram (e.g., a second cryptogram). The token provider computer 404 can generate the second cryptogram based on the authorization flag (e.g., that indicates that the interaction is not authorized) and a second credential. The second credential can be associated with the token, but may be a different credential than the first credential. For example, the first credential can be a user identifier (e.g., an employee identifier, a user transportation identifier, etc.), whereas the second credential can be a user's zip code, phone number, address, etc. that can relate to the user identifier.

As an illustrative example, the token provider computer 404 can generate the second cryptogram by encrypting input data with an encryption key, such as a symmetric encryption key. The symmetric encryption key can be stored by both the token provider computer 404 and the location access computer 412 prior to the steps depicted in FIG. 4, and may be updated with new symmetric encryption keys periodically. The token provider computer 404 can generate the second cryptogram by encrypting the second credential, the authorization flag, and a counter or time of day, as described herein.

At step 446, after generating the second cryptogram, the token provider computer 404 provides the second cryptogram to the token requestor component 402A via a second cryptogram response message. In some embodiments, the token provider computer 404 can further transmit the first credential to the token requestor component 402A along with the second cryptogram.

At step 448, after receiving the second cryptogram and the first credential, the token requestor component 402A generates a second authorization request message comprising the second cryptogram and the first credential. The second authorization request message can further include the interaction data. In some embodiments, at step 450, the token requestor component 402A can transmit the second cryptogram and the first credential to the resource provider component 402B. The resource provider component 402B can then generate the second authorization request message.

At step 452, in some embodiments, either the token requestor component 402A or the resource provider component 402B of the token requestor computer 402 can transmit the second authorization request message to the location access computer 412.

At step 454, the location access computer 412 can validate the second cryptogram. The location access computer 412 can generate a verification cryptogram by encrypting input data with an encryption key, such as a symmetric encryption key. The symmetric encryption key can be the same symmetric encryption key used by the token provider computer 404 to form the second cryptogram.

The location access computer 412 can retrieve and/or generate the input data to utilize to generate the verification cryptogram. For example, the input data can include the second credential, the authorization flag, and a counter. The location access computer 412 can determine that the second authorization request is a fallback authorization request after the first authorization request was denied. The location access computer 412 can generate the authorization flag to indicate that the interaction was declined (e.g., as was indicated in the first authorization response message). For example, the location access computer 412 can generate the authorization flag to be a value of "1," which can indicate that the first authorization request message was declined.

The location access computer 412 can also determine the counter or the time to use as input data for generating the verification cryptogram. By including the counter of the time, the location access computer 412 can catch a replay attempt of the second cryptogram. The counter can be included as input data by both the location access computer 412 and the token provider computer 404 to the verification cryptogram and the second cryptogram, respectively.

The location access computer 412 can obtain the second credential from a database maintained by the token provider computer 404. At step 456, the location access computer 412 can request the second credential from the token provider computer 404 in a second credential request message. The second credential request can include the credential, the second cryptogram, and/or the transaction channel indicator. After receiving the second credential request message, the token provider computer 404 can determine the second credential in response to the second credential request message. The token provider computer 404 can also determine if the second cryptogram was previously issued and is associated with the correct channel based on a channel indicator. The token provider computer 404 can then transmit a second credential response message to the location access computer 412. The second credential response message can include the second credential, the second cryptogram, and an indication that the credential (e.g., the PAN) was used in the correct transaction channel.

After obtaining the input data for the verification cryptogram, the location access computer 412 can generate the verification cryptogram by encrypting the authorization flag, the second credential, and the counter with the symmetric encryption key (e.g., which is the same symmetric encryption key utilized by the token provider computer 404 to form the second cryptogram).

After generating the verification cryptogram, the location access computer 412 can compare the verification cryptogram to the second cryptogram. If the second cryptogram matches the verification cryptogram then the second cryptogram was authentically created and is not a reused cryptogram (e.g., in a replay attempt). For example, a fraudulent token requestor may attempt to perform a fraudulent interaction using the first credential (e.g., user biometric data) and the cryptogram. However, the cryptogram would be expired (e.g., due to a counter included in the creation of the cryptogram, a time including in the creation of the cryptogram, etc.), thus the verification cryptogram generated by the location access computer 412 with the correct counter or time would not match the received cryptogram. By having the location access computer 412 validate the second cryptogram, fraudulent attempts with the credential can be terminated as they occur.

At step 458, after receiving the second authorization request message, the location access computer 412 determines whether or not to authorize the interaction. For example, the location access computer 412 can determine that the interaction is to be authorized based on any suitable data including, for example, the first credential and the second cryptogram. However, it is understood that the location access computer 412 can determine whether or not to authorize the location access request based on any suitable data presented to or determined by the location access computer 412.

At step 460, the location access computer 412 can then generate a second authorization response message. The second authorization response message can include an indication of whether or not the interaction is authorized. The second authorization response message can further comprise the second cryptogram, the first credential, and the interaction data.

At step 462, after generating the second authorization response message, the location access computer 412 provides the second authorization response message to the token requestor computer 402.

At step 464, the location access computer 412 can unlock the secure building or otherwise allow the user to access the secure building after authorizing the user's access. For example, the user can be granted access to the secure location.

In some embodiments, the location access computer 412 can monitor subsequent authorization request messages for the first credential. For example, the location access computer 412 can determine if a subsequently received authorization request message includes the first credential and originates from the token requestor computer 402.

Embodiments can include various methods. For example, a method can include: transmitting, by a token requestor computer to an authorizing entity computer, a first authorization request message comprising a token and a first cryptogram for authorization of an interaction between a user and a resource provider, wherein the token is associated with a credential, wherein the authorizing entity computer determines that the interaction is declined after evaluating at least the token and the first cryptogram, and generates an authorization response message comprising a response code; receiving, by the token requestor computer, the authorization response message from the authorizing entity computer; generating, by the token requestor computer, a cryptogram request message comprising the token or a token identifier associated with the token and the response code; transmitting, by the token requestor computer, the cryptogram request message to a token provider computer, wherein the token provider computer generates a second cryptogram, and provides the second cryptogram and the credential to the token requestor computer; receiving, by the token requestor computer, the second cryptogram and the credential from the token provider computer; generating, by the token requestor computer, a second authorization request message comprising the second cryptogram and the credential; and transmitting, by the token requestor computer, the second authorization request message to a network processing computer, which determines that the second cryptogram is valid, and then transmits the authorization request message comprising the credential to the authorizing entity computer, wherein the authorizing entity computer determines whether or not to authorize the interaction based on at least the credential.

Embodiments of the disclosure have a number of advantages. For example, embodiments of the invention can allow legitimate interactions to proceed, even though they may be initially declined due to reasons that may not warrant declines. As such, embodiments of the invention are more efficient and useful than conventional systems that would simply not allow legitimate but otherwise mechanically defective interactions to proceed. Furthermore, since tokens are used in embodiments of the invention, real credentials are protected as they pass through the interaction system.

To further provide for the aforementioned security, the network processing computer can monitor the token requestor computer and/or the resource provider computer for use of the new cryptogram or the credentials. As such, if the token requestor computer and/or the resource provider computer attempt to utilize the new cryptogram or the credentials in a future interaction, the cryptogram will be determined to be invalid by the network processing computer, thus terminating the fraudulent interaction attempt.

Embodiments provide for additional advantages. For example, various embodiments, reduce complexity and security hardware requirements by the resource provider computer. For example, the resource provider computer does not need to include secure hardware to store the credentials which may allow the resource provider computer to reattempt declined interactions.

Although the steps in the flowcharts and process flows described above are illustrated or described in a specific order, it is understood that embodiments of the invention may include methods that have the steps in different orders. In addition, steps may be omitted or added and may still be within embodiments of the invention.

Any of the software components or functions described in this application may be implemented as software code to be executed by a processor using any suitable computer language such as, for example, Java, C, C++, C#, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A method comprising:
   transmitting, by a token requestor computer, a first authorization request message comprising a token and a first cryptogram for authorization of an interaction between a user and a resource provider to a server computer, wherein the token is associated with a credential;
   receiving, by the token requestor computer, a first authorization response message comprising a response code from the server computer;
   responsive to receiving the first authorization response message, generating, by the token requestor computer, a cryptogram request message comprising the token or a token identifier associated with the token and the response code;
   transmitting, by the token requestor computer, the cryptogram request message to a token provider computer, wherein the token provider computer generates a second cryptogram, and provides the second cryptogram and the credential to the token requestor computer;
   receiving, by the token requestor computer, the second cryptogram and the credential from the token provider computer;
   generating, by the token requestor computer, a second authorization request message comprising the second cryptogram and the credential;
   transmitting, by the token requestor computer, the second authorization request message to the server computer for the interaction; and
   receiving a second authorization response message from the server computer in response to the second authorization request message, the second authorization response message indicating whether the interaction is authorized.

2. The method of claim 1, wherein the server computer is an authorizing entity computer, wherein after transmitting the first authorization request message, the authorizing entity computer determines that the interaction is declined after evaluating at least the token and the first cryptogram, and generates an authorization response message comprising the response code, wherein the authorization response message is received from the authorizing entity computer, and wherein transmitting the second authorization request message to the server computer for the interaction comprises: transmitting, by the token requestor computer, the second authorization request message to a network processing computer, which determines that the second cryptogram is valid, and then transmits the second authorization request message comprising the credential to the authorizing entity computer, wherein the authorizing entity computer determines whether or not to authorize the interaction based on at least the credential.

3. The method of claim 2, wherein after the network processing computer provides the second authorization request message to the authorizing entity computer, the network processing computer monitors subsequent interactions for the second cryptogram, wherein if a subsequent authorization request includes the second cryptogram, the network processing computer declines the subsequent authorization request.

4. The method of claim 2, wherein the token requestor computer is integrated with a resource provider computer.

5. The method of claim 2, wherein the cryptogram request message comprises an authorization flag that indicates that the interaction is declined.

6. The method of claim 5, wherein the credential is a first credential, and wherein the token provider computer generates the second cryptogram based on the authorization flag that indicates that the interaction is declined and a second credential, wherein the first credential is associated with the second credential.

7. The method of claim 1, wherein the response code indicates a reason why the interaction is declined.

8. The method of claim 1 further comprising:
   prior to transmitting the first authorization request message, requesting, by the token requestor computer, the token from the token provider computer; and
   receiving, by the token requestor computer, the token and the first cryptogram from the token provider computer.

9. The method of claim 8 further comprising:
   after receiving the token and the first cryptogram, generating, by the token requestor computer, the first authorization request message comprising the token and the first cryptogram.

10. A token requestor computer comprising:
    a processor; and
    a computer-readable medium coupled to the processor, the computer-readable medium comprising code executable by the processor for implementing a method comprising:
      transmitting a first authorization request message comprising a token and a first cryptogram for authorization of an interaction between a user and a resource provider to a server computer, wherein the token is associated with a credential;
      receiving a first authorization response message comprising a response code from the server computer;
      responsive to receiving the first authorization response message, generating, by the token requestor computer, a cryptogram request message comprising the token or a token identifier associated with the token and the response code;
      transmitting the cryptogram request message to a token provider computer, wherein the token provider computer generates a second cryptogram, and provides the second cryptogram and the credential to the token requestor computer;

receiving the second cryptogram and the credential from the token provider computer;

generating a second authorization request message comprising the second cryptogram and the credential;

transmitting the second authorization request message to the server computer for the interaction; and receiving a second authorization response message from the server computer in response to the second authorization request message, the second authorization response message indicating whether the interaction is authorized.

11. The token requestor computer of claim 10, wherein the server computer is an authorizing entity computer, wherein after transmitting the first authorization request message, the authorizing entity computer determines that the interaction is declined after evaluating at least the token and the first cryptogram, and generates an authorization response message comprising the response code, wherein the authorization response message is received from the authorizing entity computer, and wherein transmitting the second authorization request message to the server computer for the interaction comprises:

transmitting the second authorization request message to the network processing computer, which determines that the second cryptogram is valid, and then transmits the second authorization request message comprising the credential to the authorizing entity computer, wherein the authorizing entity computer determines whether or not to authorize the interaction based on at least the credential.

12. The token requestor computer of claim 10, wherein the server computer is a location access computer, the credential is a user identifier or user biometric data, the interaction is a location access interaction to access a secure location, and the resource provider is a location access provider, and wherein if the second authorization response message indicates that the location access interaction is authorized, the user is granted access to the secure location.

13. The token requestor computer of claim 10, wherein the response code indicates a reason why the interaction is declined of an incorrect cryptogram, an incorrect token, or a missing data field.

14. The token requestor computer of claim 10, wherein the method further comprises:

after transmitting the second authorization request message, removing the credential from memory.

15. The token requestor computer of claim 10, wherein the credential is a first credential, wherein the cryptogram request message comprises an authorization flag that indicates that the interaction is declined, and wherein the token provider computer generates the second cryptogram based on the authorization flag and a second credential, wherein the first credential is associated with the second credential.

16. The token requestor computer of claim 15, wherein the first credential is a primary account number and wherein the second credential is a verification value.

17. A method comprising:

receiving, by a token provider computer from a token requestor computer, a cryptogram request message comprising a token or a token identifier associated with the token and a response code;

determining, by the token provider computer, whether or not to provide a cryptogram to the token requestor computer based on the response code;

generating, by the token provider computer, the cryptogram;

generating, by the token provider computer, a cryptogram response message comprising the cryptogram and a credential; and providing, by the token provider computer, the cryptogram response message to the token requestor computer, wherein the token provider computer transmits an authorization request message comprising the cryptogram and the credential to a server computer for an interaction and receives an authorization response message from the server computer in response to the authorization request message, the authorization response message indicating whether the interaction is authorized.

18. The method of claim 17, wherein the cryptogram request message further comprises an authorization flag, wherein the cryptogram is generated based on the authorization flag, and wherein the response code indicates a reason why the interaction is declined, the method comprising:

retrieving, by the token provider computer, the credential associated with the token identified by the token identifier from a database.

19. The method of claim 17, wherein the cryptogram is a second cryptogram, wherein the authorization request message is a second authorization request message, wherein the authorization response message is a second authorization response message, the method further comprising:

receiving, by the token provider computer, a request for the token from the token requestor computer; and providing, by the token provider computer, the token and a first cryptogram associated with the token to the token requestor computer, wherein the token requestor computer provides a first authorization request message comprising the token, the first cryptogram, and interaction data to the server computer, wherein the server computer declines the interaction and provides a first authorization response message comprising the token, the response code, and the interaction data to the token requestor computer.

20. The method of claim 19 further comprising:

prior to generating the second cryptogram, verifying, by the token provider computer, that a time between providing the token and the first cryptogram and receiving the second cryptogram request message is less than a predefined timeframe.

* * * * *